(12) United States Patent
Hullegien

(10) Patent No.: US 11,867,326 B2
(45) Date of Patent: Jan. 9, 2024

(54) PROFILED LEAK-BEFORE-PRESS SEALING RING FOR A PRESS FITTING WITH ARC-SHAPED FIRST TYPE RING PORTIONS ALTERNATING WITH LINEAR-SHAPED SECOND TYPE RING PORTIONS

(71) Applicant: Aalberts integrated piping systems B.V., Hilversum (NL)

(72) Inventor: Andreas Hubertus Hullegien, Vleuten (NL)

(73) Assignee: Aalberts integrated piping systems B.V., Hilversum (NL)

( * ) Notice: Subject to any disclaimer, the term of this patent is extended or adjusted under 35 U.S.C. 154(b) by 124 days.

(21) Appl. No.: 17/768,887

(22) PCT Filed: Oct. 21, 2020

(86) PCT No.: PCT/EP2020/079564
§ 371 (c)(1),
(2) Date: Apr. 14, 2022

(87) PCT Pub. No.: WO2021/078769
PCT Pub. Date: Apr. 29, 2021

(65) Prior Publication Data
US 2023/0119522 A1    Apr. 20, 2023

(30) Foreign Application Priority Data

Oct. 21, 2019   (NL) .................................... 2024068

(51) Int. Cl.
*F16L 13/14* (2006.01)
(52) U.S. Cl.
CPC ........... *F16L 13/148* (2013.01); *F16L 13/142* (2013.01)

(58) Field of Classification Search
CPC ....... F16L 13/14; F16L 13/142; F16L 13/148; F16L 21/03; F16L 21/02; F16L 21/022;
(Continued)

(56) References Cited

U.S. PATENT DOCUMENTS 7,823,932 B2 * 11/2010 Webb .................... F16L 13/148
285/345
2006/0175829 A1 * 8/2006 Kaimer ................. F16L 13/148
285/256
(Continued)

FOREIGN PATENT DOCUMENTS

DE    298 13 935 U1   10/1998
WO    2011/146160 A1  11/2011

*Primary Examiner* — Aaron M Dunwoody
(74) *Attorney, Agent, or Firm* — Hoffmann & Baron, LLP

(57) ABSTRACT

A profiled leak-before-press sealing ring includes a plurality of arc-shaped first and linear-shaped second type ring portions that lie alternating around a center axis. The second type ring portions extend linear-shaped with straight inner and outer surfaces in a tangential direction. The first type ring portions have curved inner and outer surfaces of constant radii around the center axis. The ring further includes a plurality of third type ring portions that extend arc-shaped in between respective ones of the arc-shaped first and linear-shaped second type ring portions, and that each connect with its head ends to head ends of neighbouring ones of the first and second type ring portions. The arc-shaped first, the linear-shaped second, and the arc-shaped third type ring portions all have a same evenly large dimensioned cross-sectional shape.

12 Claims, 16 Drawing Sheets

(58) Field of Classification Search
CPC .. F16L 17/00; F16L 17/02; F16L 17/06; F16J 15/02; F16J 15/022; F16J 15/10; F16J 15/104
USPC .................................................. 285/382, 374
See application file for complete search history.

(56) References Cited

U.S. PATENT DOCUMENTS

2007/0246938 A1* 10/2007 Webb .................... F16L 13/142
  285/345
2010/0148495 A1*  6/2010 Glaze .................... F16L 13/142
  285/344
2011/0285094 A1* 11/2011 Henry .................... F16L 13/142
  277/626
2017/0102101 A1*  4/2017 Duval-Arnould .... F16J 15/3232
2019/0128424 A1*  5/2019 Sato ....................... F16J 15/025

* cited by examiner

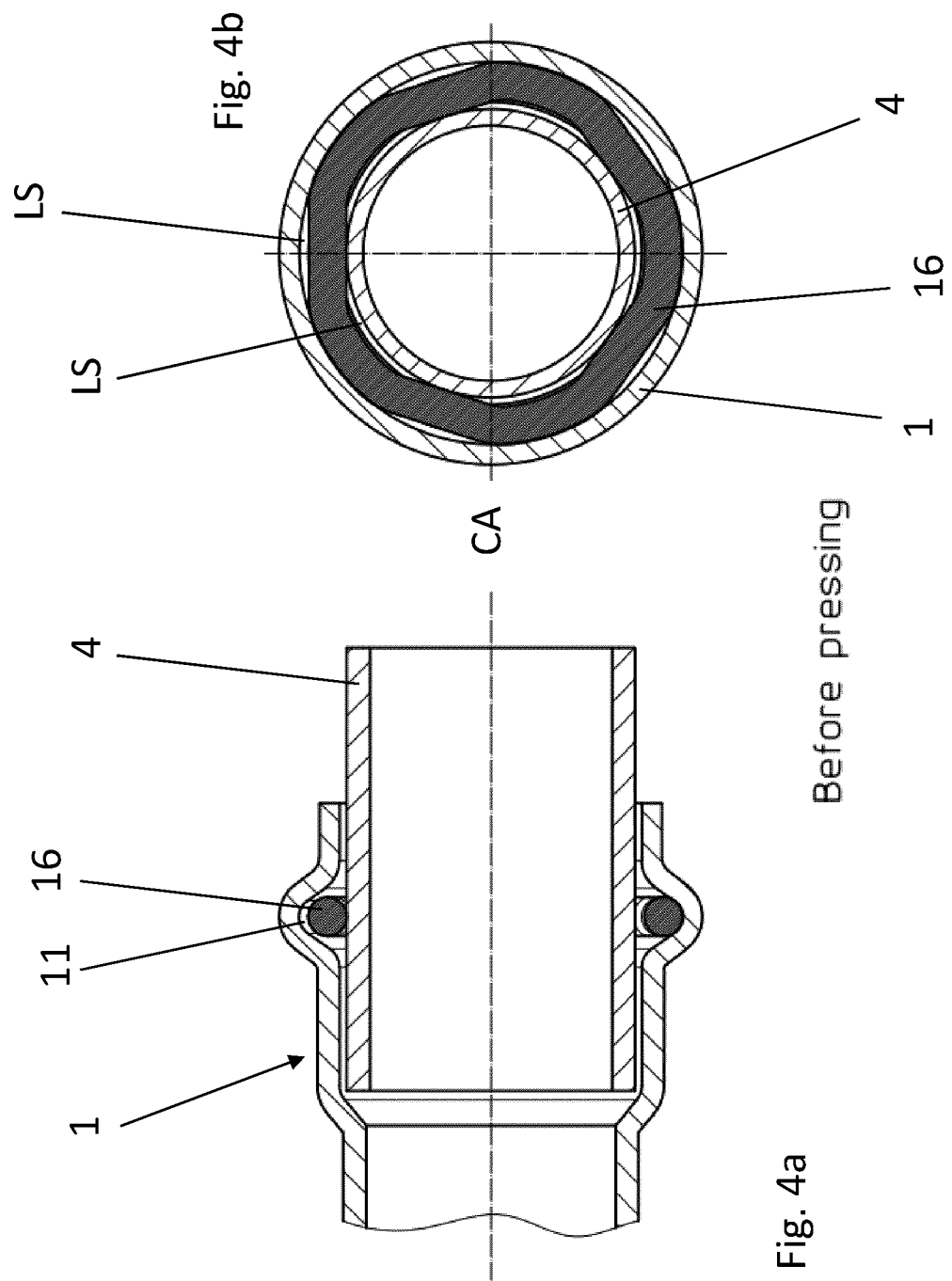

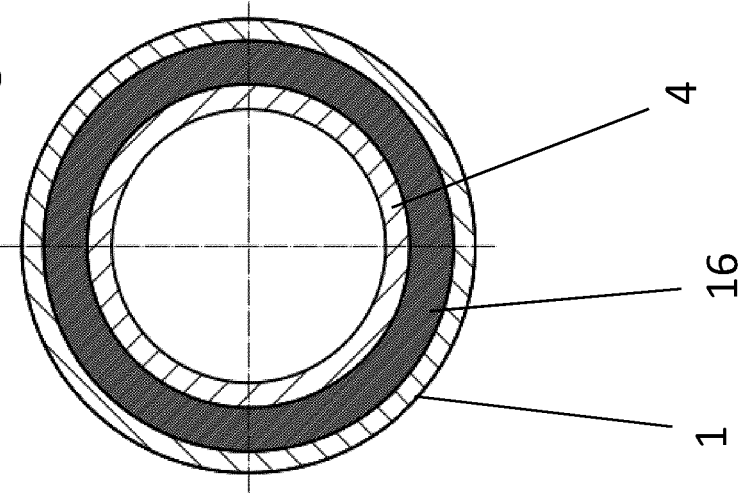
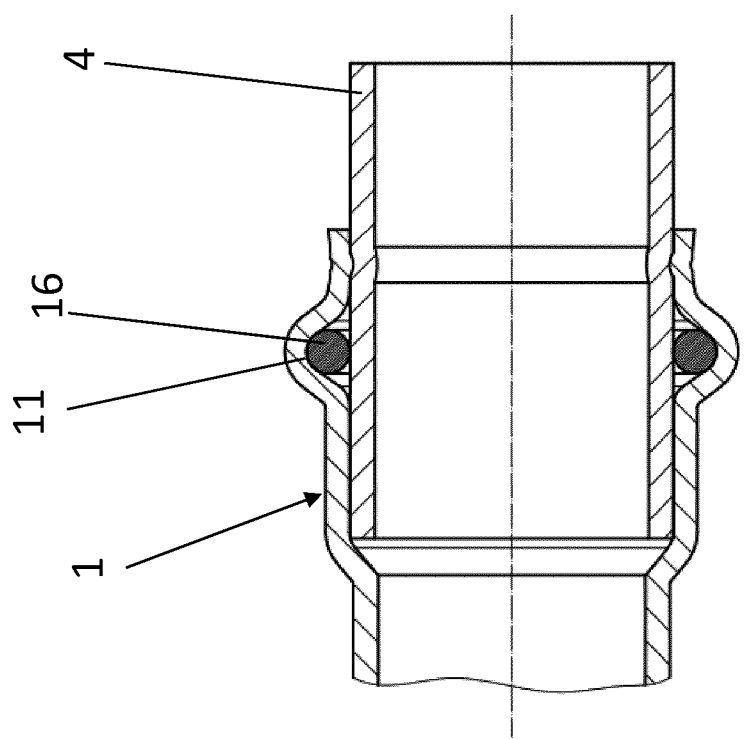

Section A-A

PROFILED LEAK-BEFORE-PRESS SEALING RING FOR A PRESS FITTING WITH ARC-SHAPED FIRST TYPE RING PORTIONS ALTERNATING WITH LINEAR-SHAPED SECOND TYPE RING PORTIONS

CROSS-REFERENCE TO RELATED APPLICATIONS

This application is the National Stage of International Application No. PCT/EP2020/079564, filed Oct. 21, 2020, which claims the benefit of Netherlands Application No. 2024068, filed Oct. 21, 2019, the contents of which is incorporated by reference herein.

FIELD OF THE INVENTION

The present invention relates to a profiled leak-before-press sealing ring for leaving free empty leaking spaces between a socket and a pipe end of a press fitting in a non-compressed state.

BACKGROUND OF THE INVENTION

For example WO-2011/146160 discloses a sealing ring for crimp-type couplings that has a profiled inner and outer circumferential shape such that intentional leak paths are created before the joint is crimped. In this way it is aimed to prevent false indications of a crimped joint. For that the profiled sealing ring comprises four alternating sets of first and second type ring portions. The first type ring portions are curved outwards along circular arcs with a constant radius around a center axis of the ring. The second type ring portions are each curved inwards towards the center axis. With this most of centroids of cross-sections of each second type ring portion lie on a circular arc that has its center outside of the ring. Between the first and second type ring portions transition regions are provided that lie on curves which smoothly blend the respective circular arcs formed by the first and second type ring portions.

A disadvantage hereof is that the reliability of this sealing ring after the coupling has been crimped leaves to be improved. As soon as a pipe end has been inserted into a socket of this crimp-type coupling, this known sealing ring leaves free truly large leak paths between its outer circumference and the socket as well as between its inner circumference and the pipe end. During crimping all those large leak paths need to be closed. For that a large and heavy crimping action with a dedicated tool is necessary. During this crimping the outwards curved first type ring portions need to get pressed radially inward at least over a radial height of the leak paths, such that those leak paths get fully closed. This inward pressing however also means that some excess sealing ring material of the outwards curved first type ring portions as well as of the transition regions may start to locally accumulate and there form pile-ups of sealing material. This makes the crimping process heavier and even may disturb the aimed crimping. Also this may lead to leakages being more likely to start occurring at some point in time for crimped couplings. This can particularly be the case if tolerances of the sealing ring as well as of the socket and pipe end all get to add up.

Another disadvantage is that, also dependent on tolerances that may occur, an installer during insertion of a pipe end shall not always get a feel of the sealing ring being actually present inside the socket. This has to do with the minimal contact between the pipe end and the innermost points of the inward curved second type ring portions. This minimum contact between the sealing ring and the pipe end during insertion however may also lead to the pipe end to prematurely slip partly or entirely out of the socket again after having been inserted therein, but still preceding or during crimping of the coupling.

Other leak-before-press sealing rings for press fittings are known from DE-29813935U1. Some of them are provided with an inward or outward bulge for forming intentional leak paths sideways thereof, and one of them is provided with an outward bulge in combination with a through-going opening for forming an additional leak path. In FIG. 4 of this DE-29813935U1 an embodiment is shown of which the sealing ring is provided with a number of circumferentially spaced outward bulges in combination with flattened ring portions lying in between them. At the location of the bulges the ring seems to be somewhat thicker by comprising extra sealing ring material there. DE-29813935U1 also aims to have inner and outer intentional leak paths created before pressing of a press fitting, which inner and outer leak paths are aimed to automatically get closed when a socket of the press fitting inside which the sealing ring is placed and inside which a pipe end is inserted, gets pressed.

A disadvantage hereof is that the transitions between each flattened ring portion and its neighbouring outward bulges are somewhat abrupt. Another disadvantage is that the outward bulges make the ring more difficult and expensive to manufacture, also because, during cooling down, its crimping behaviour may differ along its circumference, resulting in somewhat more unpredictable varying ring shapes. In combination with tolerance of the sealing ring as well as of the socket and the pipe end this may lead to too large or too small leak paths to occur before pressing. On the other hand the provision of the outward bulges means that those pile-ups of excess sealing ring material make the pressing process heavier and even may disturb the aimed pressing. This may lead to leakages being more likely to start occurring at some point in time for pressed fittings. This can particularly be the case if tolerances of the sealing ring as well as of the socket and pipe end get to all add up.

SUMMARY OF THE INVENTION

The present invention aims to overcome those disadvantages at least partly or to provide a usable alternative. In particular the present invention aims to provide an improved user-friendly profiled leak-before-press sealing ring that is easier and more cost-efficient to manufacture and that is able to guarantee true large leaking spaces inside a press fitting for detection that it that has been forgotten to get pressed, while at a same time being able to guarantee that the ring gets to seal all around its circumference after having been pressed.

According to the present invention this aim is achieved by a profiled leak-before-press sealing ring for leaving free empty leaking spaces between a socket and a pipe end of a press fitting in a non-compressed state according to the present invention. The sealing ring comprises a plurality of first type ring portions, and a plurality of second type ring portions, wherein the first and second type ring portions lie alternating around a center axis, wherein the first type ring portions each extend arc-shaped around the center axis, and wherein the second type ring portions each extend linear-shaped with a straight inner surface and with a straight outer surface in a tangential direction that is perpendicular to a radial direction going through the center axis. According to the inventive thought the arc-shaped first type ring portions each have a curved inner surface of a constant radius around the center axis and a curved outer surface of a constant radius around the center axis. The ring further comprises a plurality of arc-shaped third type ring portions that each lie in between respective ones of the arc-shaped first and linear-shaped second type ring portions, and that each connect with one of its head ends to a head end of a neighbouring one of the arc-shaped first type ring portions, and with an opposing one of its head ends to a head end of a neighbouring one of the linear-shaped second type ring portions. The arc-shaped first type ring portions, the linear-shaped second type ring portions, and the arc-shaped third type ring portions all have a same evenly large dimensioned cross-sectional shape.

Thus advantageously a truly reliable leak-before-press sealing ring is obtained, both in being able to guarantee a showing of leakages of a press fitting inside which it has been used when one accidentally has forgotten to press this press fitting during installation, as well as in being able to guarantee a perfect seal for as long as desired of the press fitting when it indeed has been pressed during installation.

The arc-shaped first type ring portions can now be given a constant outer radius that is substantially the same as an inner radius of an annular groove-shaped space that is present in or delimited by a press wall part that delimits a press region of an insertion space inside a socket for a pipe end to be inserted therein, such that they automatically come to neatly lie sealing against the press wall part immediately after being placed inside the socket. Furthermore, the arc-shaped first type ring portions can now be given a constant inner radius that is larger than an outer radius of such a pipe end to be inserted in the insertion space of the socket, such that aimed leaking space heights automatically get obtained. Even further, the linear-shaped second type ring portions each can now be given a straight inner surface that lies at a radial distance from the center axis that is smaller than an outer radius of a pipe end to be inserted, such that a firm gripping of an inserted pipe end automatically takes place, giving an installer a good feel of resistance during insertion as indication that the sealing ring indeed is present inside the socket. At a same time, the provision of the arc-shaped third type ring portions can help to form true smooth stepless transitions between those specifically dimensioned and shaped arc-shaped first type ring portions on the one side and the linear-shaped second type ring portions on the other side, such that their cross sectional shapes and dimensions can be kept exactly the same.

Thus a profiled leak-before-press sealing ring is obtained with arc-shaped first ring portions that can be optimally adapted to lie sealing inside a socket before, during and after pressing of the socket, with linear-shaped second ring portions that can be optimally adapted to firmly grip, guide and hold a pipe end during insertion as well as for as long as it takes before pressing and during pressing. During pressing no piling up of large amounts of excess sealing ring material has to take place. In fact, because all cross-sections of the different ring portions are exactly the same, and no abrupt sudden transitions are present alongside the inner and outer circumference of the ring, a uniform pressing of the press fitting can take place that results in a uniform sealing of the sealing ring all around its outer circumference against the socket and around its inner circumference against the pipe end.

In a preferred embodiment a tangential direction of the one head end of the arc-shaped third type ring portions may correspond to a tangential direction of the head end of the neighbouring one of the arc-shaped first type ring portions, and a tangential direction of the opposing one of the head ends of the arc-shaped third type ring portions may correspond to the tangential direction of the neighbouring one of the linear-shaped second type ring portions. Thus advantageously 100% smooth and stepless transitions are obtained in between the arc-shaped first type and the linear-shaped second type ring portions, further adding to the functioning, reliability and manufacturability of the ring.

In a preferred further or alternative embodiment the third type ring portions each may have a curved inner surface of a constant radius that is smaller than the constant radius of the curved inner surface of the first type ring portion, and each may have a curved outer surface of a constant radius that is smaller than the constant radius of the curved outer surface of the first type ring portion. Thus the entire ring can now be made quite smooth and regular with merely truly circle segment-shaped and truly linear-shaped ring portions all of a same cross-sectional shape and connecting stepless with each other.

In a preferred further or alternative embodiment the linear-shaped second type ring portions each may have their straight inner surface lie closer to the center axis than the curved inner surfaces of the arc-shaped first type ring portions, and the linear-shaped second type ring portions each may have their straight outer surface lie closer to the center axis than the curved outer surfaces of the arc-shaped first type ring portions. Thus advantageously the minimum distance relative to the center axis of the linear-shaped second type ring portions can be made a large step smaller than the corresponding radii of the arc-shaped first type ring portions, while the third type ring portions are well able to form smooth and stepless transitions between them. This makes it possible to easily have large leaking spaces formed inside non-pressed press fittings.

In a preferred further or alternative embodiment an uneven number of alternating sets of the arc-shaped first and the linear-shaped second type ring portions can be provided with the third type ring portions each time provided in between them. The advantage hereof is that the uneven number makes it possible to guarantee sufficient gripping force of the sealing ring onto the pipe end during insertion of the pipe end, not only for perfectly round pipe ends but also for slightly deformed ones, that for example may have become somewhat oval-shaped in cross-section.

In a preferred further embodiment three alternating sets of the arc-shaped first and the linear-shaped second type ring portions can be provided with the third type ring portions each time provided in between them. The linear-shaped second type ring portions then each may have a length in their tangential direction of between 6-13 mm, and/or the arc-shaped first type ring portion then each may cover an angle around the center axis of between 70-88 degrees. The advantage hereof is that the choice for merely three alternating sets has appeared to match well with a use of relative large dimensioned pipe ends. This is because such relative large dimensioned pipe ends have relative large tolerance fields for their outer diameter. In order to be able to guarantee good sealing between the sealing ring and the pipe end in all cases, including worst case scenario's, the sealing ring then preferably is made with a relative large cord thickness. Owing to the large cord thickness, the nominal play between the pipe end and the sealing ring than however becomes smaller, which may lead to too high gripping forces to occur between the sealing ring and the pipe end, particularly in cases when the pipe end is above nominal, or even is at its maximum oversized dimension. The number of three alternating sets of first and second type ring portions with the third type ring portions lying in between them, then may help to prevent the gripping force of becoming too large, since three sets are able to give less "pipe grip" than for example a number of five sets.

In a preferred alternative further embodiment five alternating sets of the arc-shaped first and the linear-shaped second type ring portions can be provided with the third type ring portions each time provided in between them. The linear-shaped second type ring portions then each may have a length in their tangential direction of between 6-13 mm, and/or the arc-shaped first type ring portion then each may cover an angle around the center axis of between 18-38 degrees. The advantage hereof is that the choice for a total of five alternating sets has appeared to match well with a use of smaller dimensioned pipe ends. This is because such smaller dimensioned pipe ends have smaller tolerance fields for their outer diameter. In order to be able to guarantee good sealing between the sealing ring and the pipe end in all cases, including worst case scenario's, the sealing ring then can be made with smaller cord thickness. Owing to the smaller cord thickness, the nominal play between the pipe end and the sealing ring than is larger, which already helps enough to prevent too high gripping forces to occur between the sealing ring and the pipe end, including in cases when the pipe end is above nominal, or even is at its maximum oversized dimension. The number of five alternating sets of first and second type ring portions with the third type ring portions lying in between them, then may help to prevent the gripping force of becoming too small, since five sets are able to give more "pipe grip" than the earlier mentioned number of three sets.

The invention also relates to a press fitting comprising such a sealing ring.

Further preferred embodiments of the invention are stated herein.

BRIEF DESCRIPTION OF THE DRAWINGS

The invention shall be explained in more detail below with reference to the accompanying drawings in which:

FIG. 4a shows a sectional view of a second type of press fitting in a non-compressed state with a pipe end inserted therein, and with a round cross-sectional shaped leak-before-press sealing ring according to the invention;

FIG. 4b shows a cross-sectional view over the line 4b-4b in FIG. 4a;

FIGS. 6a and 6b show the views of the press fitting of FIG. 4 after pressing;

DETAILED DESCRIPTION OF THE INVENTION

Figure 1:
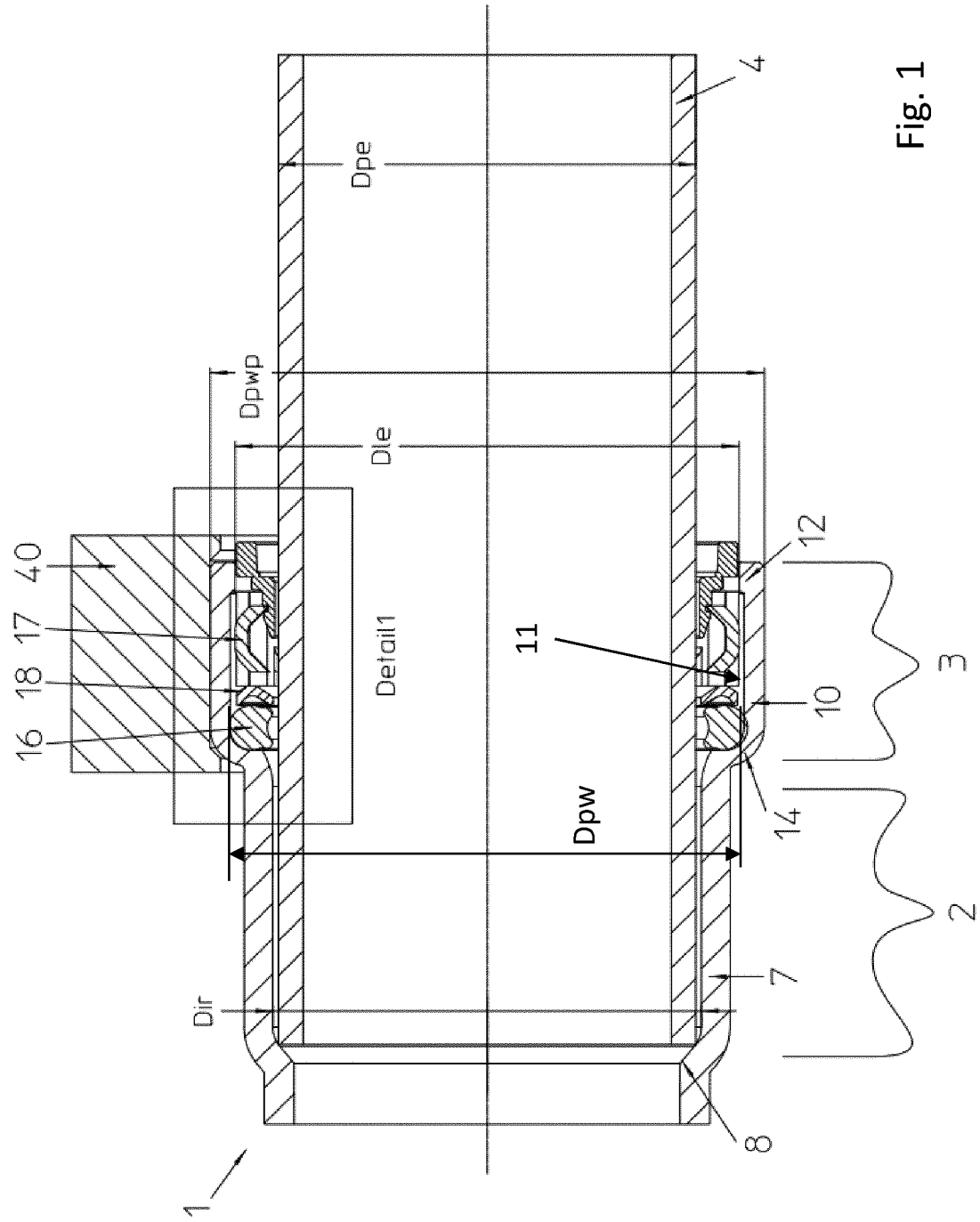
FIG. 1 shows a sectional view of a first type of press fitting in a non-compressed state with a pipe end inserted therein and part of a pressing tool ready for pressing, and with a ridged cross-sectional shaped leak-before-press sealing ring according to the invention.

The press fitting comprises a steel socket which has been given the reference numeral 1 in FIG. 1. The socket 1 comprises an insert region 2 and a press region 3. A pipe end 4 has been inserted into an insertion space of the insert and press regions 2, 3.

The insert region 2 is delimited by a substantially cylindrical insert wall part 7 which has an inner diameter Dir which is slightly larger than an outer diameter Dpe of the pipe end 4, such that the pipe end 4 could be easily inserted therein until it came to abut against an abutment edge 8.

The press region 3 is formed by a substantially cylindrical press wall part 10. This press wall part 10 forms a widened section relative to the insert wall part 7. Inside the press wall part 10, a groove-shaped space 11 is present. The groove-shaped space 11 has been manufactured in the press wall part 10 by means of a machining operation in which metal has been removed from the inside of the press wall part 10. With this the press wall part 10 before machining had a substantially same wall thickness as the insert wall part 7, but after machining has a reduced wall thickness compared thereto. The machining operation has been performed over almost the entire length of the press region 3. Only at the free end of the press region 3 the machining operation has not taken place such that a radially inwardly projecting edge 12 is formed there. This edge 12 delimits the groove-shaped space 11 towards a free end of the socket 1. At an axial inward side the groove-shaped space 11 is delimited by a transitional wall part 14 which extends between the insert wall part 7 and the press wall part 10.

In the groove-shaped space 11 a sealing ring 16 and a gripping ring 17 are placed. A separate distinctive spacer ring 18 is placed in between the sealing ring 16 and the gripping ring 17. Furthermore a check ring 19 has been clicked onto the gripping ring 17.

Figure 2A:
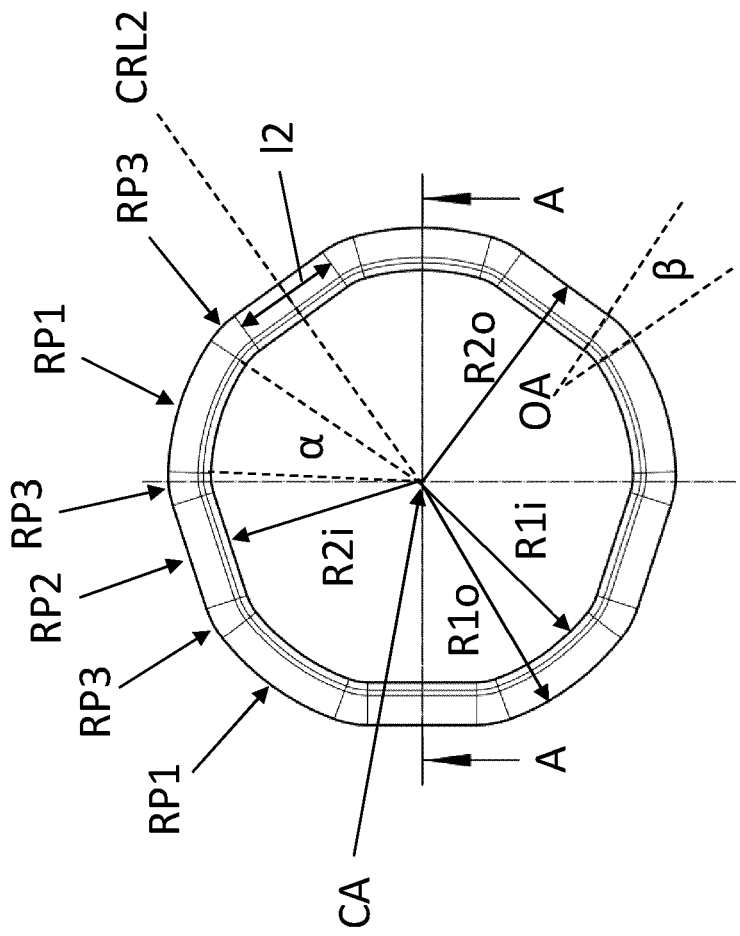
FIGS. 2a and 2b show a front view and a sectional view over the line A-A of the sealing ring of FIG. 1.
Figure 2B:
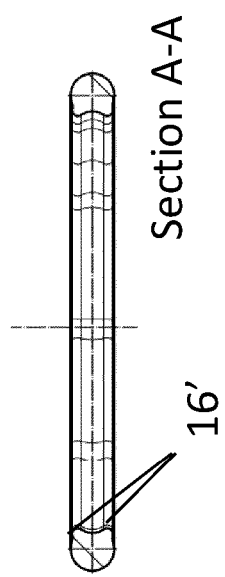

According to the invention the sealing ring 16 is of a specifically profiled leak-before-press type that can best be seen in FIGS. 2a and 2b and that is specifically designed to intentionally leave a number of leaking spaces free between the sealing ring 16 and the pipe end 4 as long as the press fitting is still in its non-compressed state.

For that the sealing ring 16 here comprises five circle-segment-shaped first type ring portions RP1 that each extend over an angle α of 31.5 degrees around a center axis CA. Furthermore, the sealing ring 16 here comprises five linear-shaped second type ring portions RP2 that each extend in their own tangential direction relative to their own center radial line CRL2 that goes through the central axis CA. Each linear-shaped second ring type portion has a length 12 in the tangential direction of 11.2 mm. Further the sealing ring 16 here comprises ten circle-segment-shaped third type ring portions RP3 that extend over an angle β of 20.2 degrees around an offset axis OA that lies inside the ring 16.

The first, second and third type ring portions RP1, RP2 and RP3 are provided alternating around the center axis in the order third type, first type, third type, second type, third type, first type, third type, second type, third type, etc. With this, head ends of the third type ring portions RP3 fully coincide with head ends of neighbouring ones of the first and second type ring portions RP1 and RP2.

The first, second and third type ring portions RP1, RP2 and RP3 all have a same evenly large dimensioned cross-sectional shape. This cross-sectional shape here comprises a circle segment along its outer circumferential side and two radially inwardly projecting circumferential ridges 16' along its inner circumferential side. Between those ridges 16' a concave hollow is present. The ridges 16' give the sealing ring 16 sideways stability against rolling during assembly. Furthermore they make it possible for the sealing ring 16 to properly seal against irregularities which might be present on the inserted pipe end 4. Finally they give the sealing ring 16 more volume compared to a conventional O-ring and thus more stability and sealing capacities.

The inner radius R1i of the first type ring portions RP1 is substantially equal to half the inner diameter Dir of the substantially cylindrical insert wall part 7 of the insert region 2 of the socket 1. The minimum inner radial distance R2i along the center radial line CRL2 of the second type ring portions RP2 is slightly smaller than half the outer diameter Dpe of the pipe end 4. Thus, in the non-compressed state, leaking spaces with a maximum height of approximately 0.5x(Dir-Dpe) are left free at five positions divided around the circumference of the pipe end 4.

The outer radius R1o of the first type ring portions RP1 is substantially equal to half an inner diameter Dpw of the groove-shaped space 11 inside the press wall part 10 of the socket 1. The minimum outer radial distance R2o along the center radial line CRL2 of the second type ring portions RP2 is slightly smaller than half the inner diameter Dpw of the groove-shaped space 11 inside the press wall part 10 of the socket 1.

The third type ring portions RP3 have been designed with such small inner and outer radius and have their offset axis OA positioned such inside the ring 16 between the center axis CA and the inner circumferential surface of the ring 16, that:
a tangential direction of their one head end coincides with a tangential direction of the head end of the neighbouring first type ring portion RP1; and
a tangential direction of their opposing head end coincides with the tangential direction of the neighbouring second type ring portion RP2.

After insertion of the sealing ring inside the groove-shaped space 11 in the socket 1, the outer circle-segment-shaped surfaces of the first type ring portions shall cause the ring 16 to reliably stay in place, for example during transport and storage, but also during insertion of the pipe end 4. During this insertion of the pipe end 4, the straight inner surfaces of the second type ring portions RP2 shall exert a frictional force on the pipe end 4, in particular at such a level that an installer is guaranteed to feel the presence of the sealing ring 16 inside the socket 1, but still can easily have the pipe end 4 inserted therein until it comes to abut against the abutment edge 8.

The press region 3 of the press fitting of FIG. 1 can now be compressed from the non-compressed state into the compressed state by means of a press tool 40. This press tool 40, of which only a part has been schematically shown in FIG. 1, is designed to exert a radially inward directed pressing action on the outer side of the press wall part 10. Because of this the press wall part 10 starts to deform and gets radially compressed to a smaller diameter. In the compressed state the gripping ring 17 has gotten to grip with grasping teeth into the pipe end 4. The sealing ring 16 has gotten deformed such that it closes all initial leaking spaces and substantially fills up the entire space between the pipe end 4, the transitional wall part 14, the press wall part 10 and the spacer ring 18.

As soon as the press tool 40 is removed at the end of the pressing action, the press wall part 10 is deemed to undergo a slight amount of relaxation. Owing to biasing forces inside the sealing ring 16, it is able to slightly spring back and thus keep on having its inner and outer surfaces lying firmly sealing against the pipe end 4 and the press wall part 10.

Figure 3:
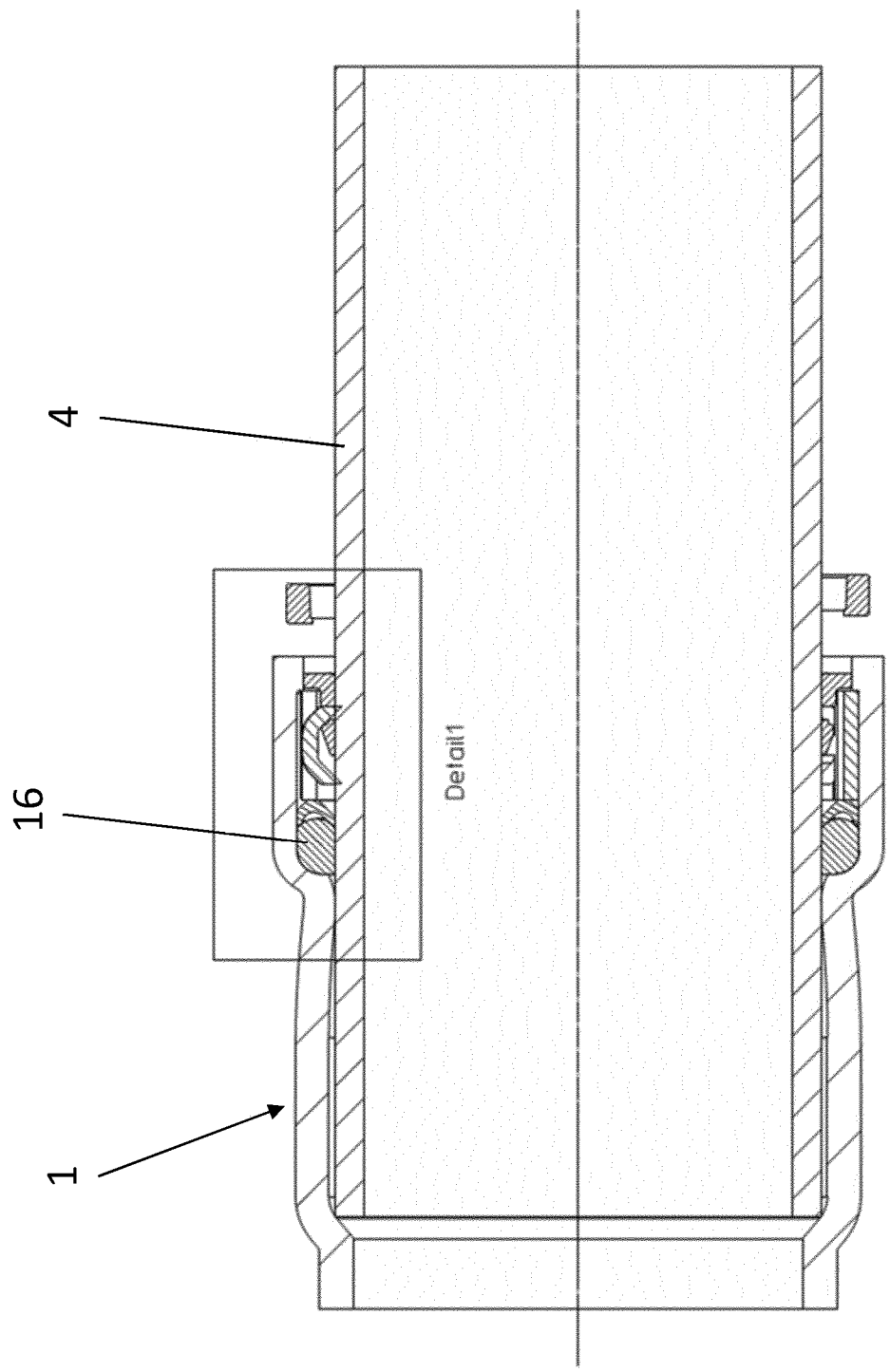
FIG. 3 shows the view of the press fitting of FIG. 1 after pressing.
Figure 5A:
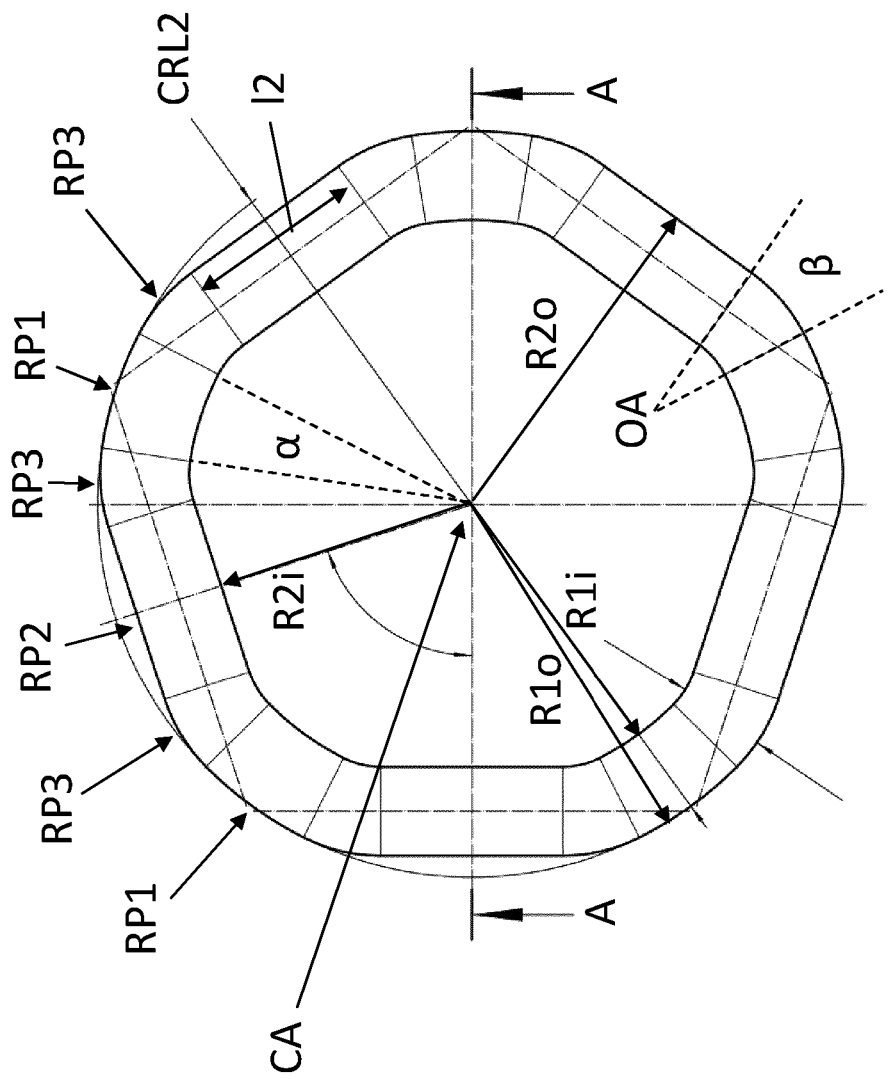
FIGS. 5a and 5b show a front view and a sectional view over the line A-A of the sealing ring of FIG. 4.
Figure 5B:
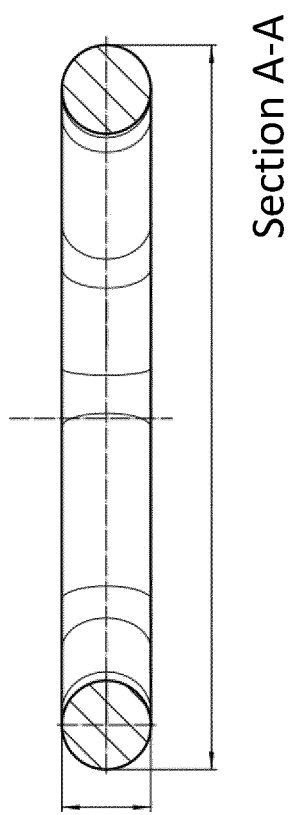
Figure 7A:
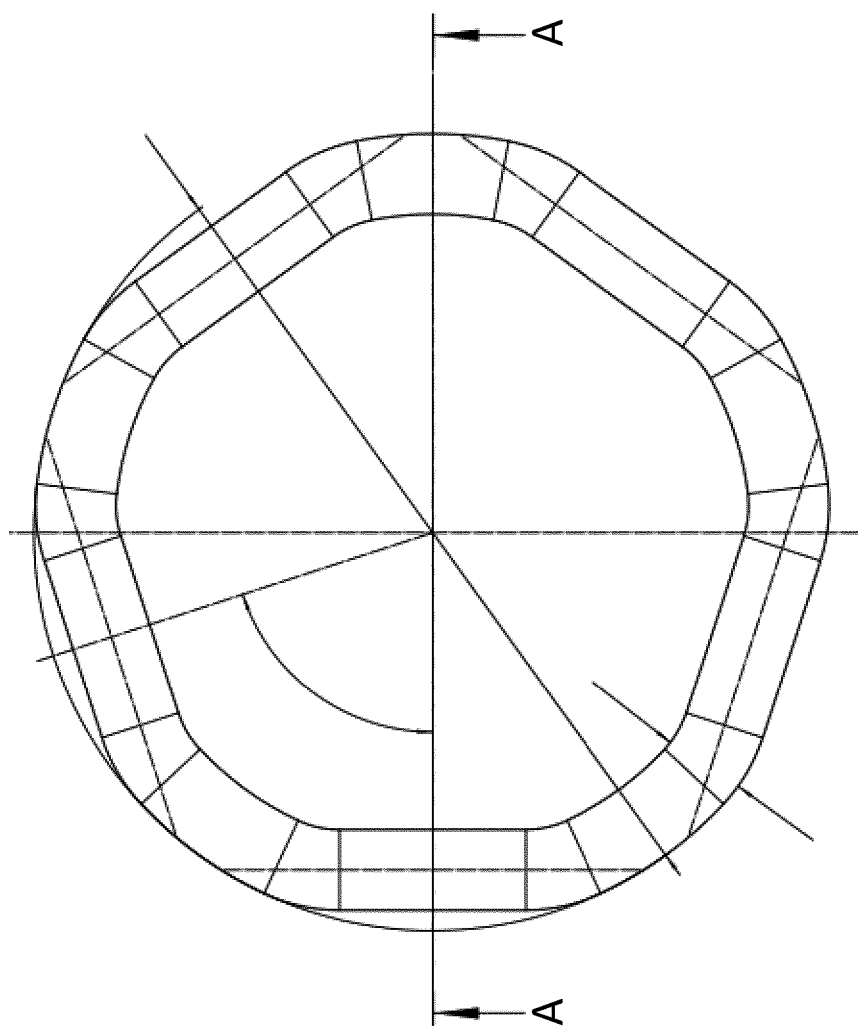
FIGS. 7a and 7b show views similar to FIGS. 5a and 5b of a first variant.
Figure 7B:
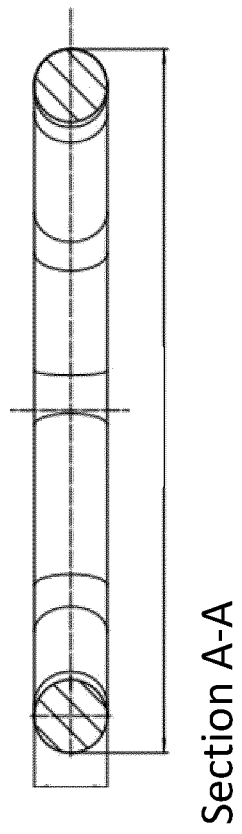
Figure 8A:
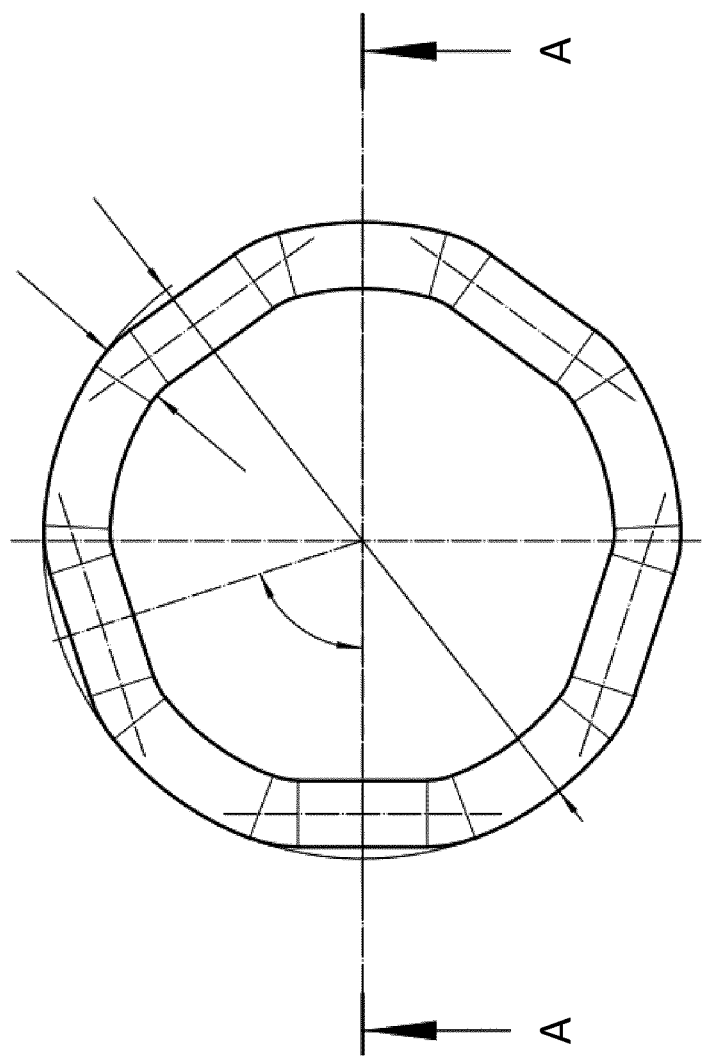
FIGS. 8a and 8b show views similar to FIGS. 5a and 5b of a second variant.
Figure 8B:
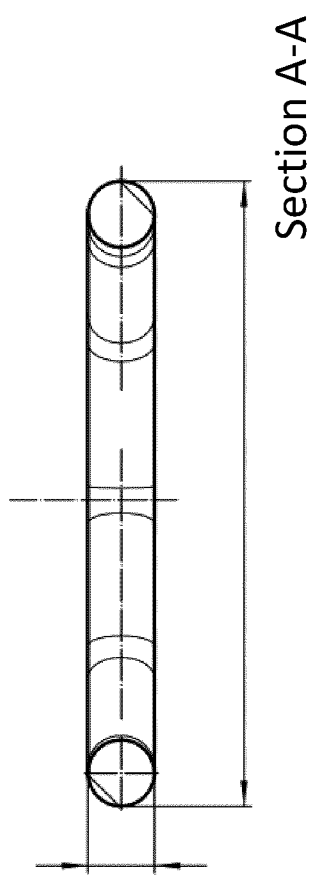
Figure 9A:
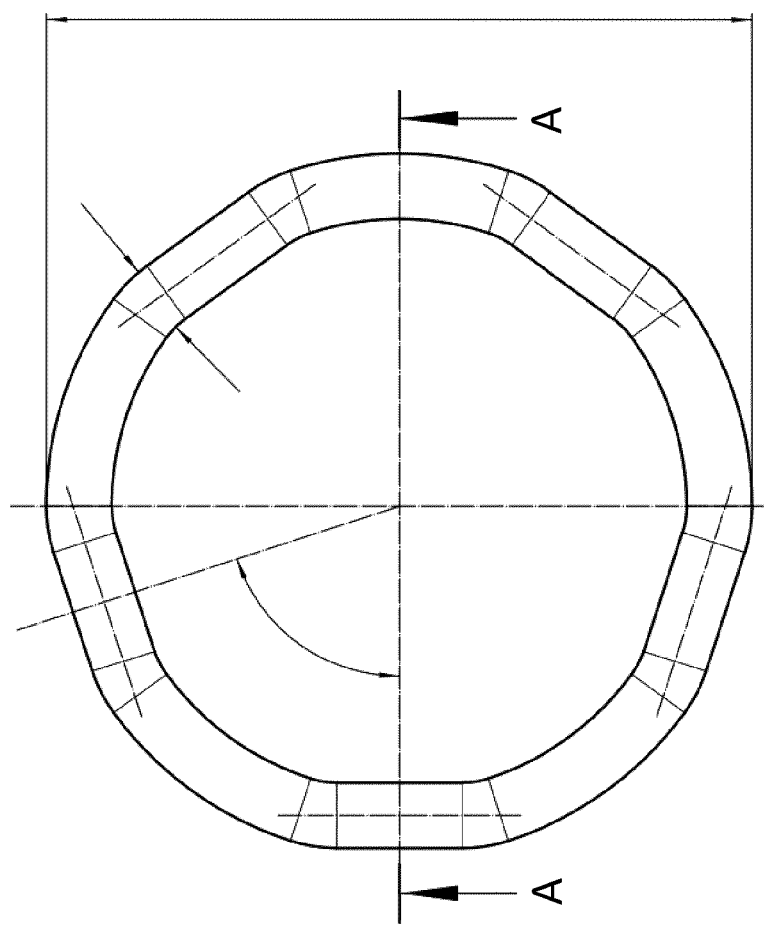
FIGS. 9a and 9b show views similar to FIGS. 5a and 5b of a third variant.
Figure 9B:
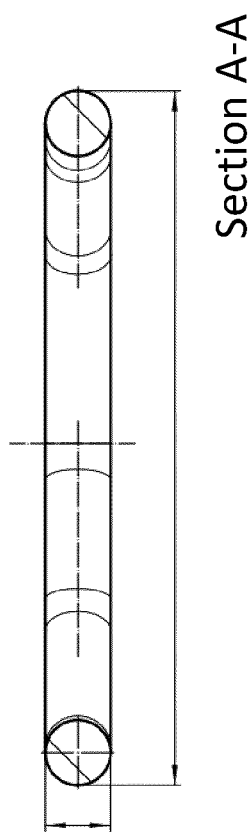

In FIGS. 4a and 4b a different type of press fitting is shown, that is to say one of a thick walled steel type of which the socket 1 is provided with a so-called V-profile that delimits a groove-shaped space 11 inside which only a leak-before-press sealing ring 16 according to the invention is placed. The sealing ring 16 used here can best be seen in FIGS. 5a and 5b, and is of a round cord cross-sectional shaped variant that for the rest has the same alternation of first, second and third type ring portions RP1, RP2 and RP3 as the ring in FIG. 1-3.

In FIG. 4a the non-compressed state is shown. In FIG. 4b the leaking spaces LS can clearly be seen. In FIG. 6a the compressed state is shown. In FIG. 6b the leaking spaces LS are no longer present. The pressing of the fitting has caused the sealing ring to deform such that it fills up the entire space between the pipe end and the socket.

In FIGS. 7a and 7b, 8a and 8b, and 9a and 9b variants are shown with still five sets of first and second type ring portions RP1 and RP2, but then having different radii, covering different angles, and having different lengths, such that they have become fit for use in increasingly larger diameter pipe fittings.

Figure 10A:
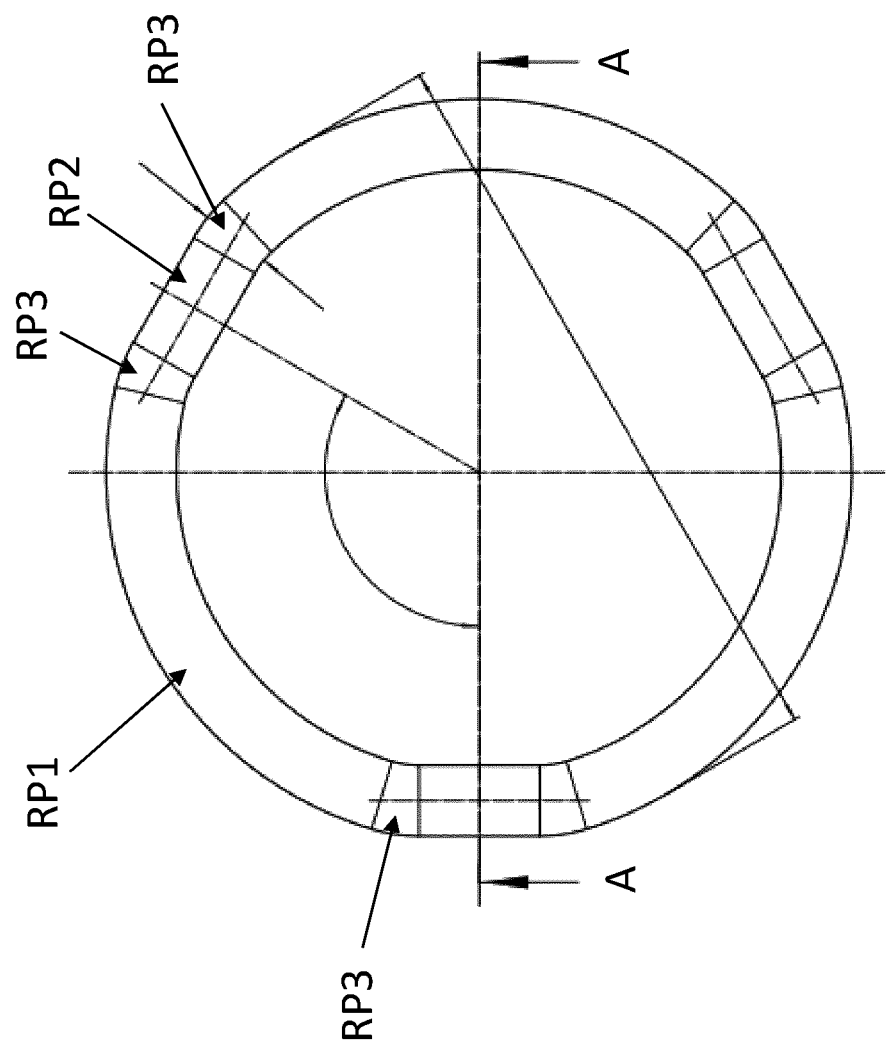
FIGS. 10a and 10b show views similar to FIGS. 5a and 5b of a fourth variant.
Figure 10B:
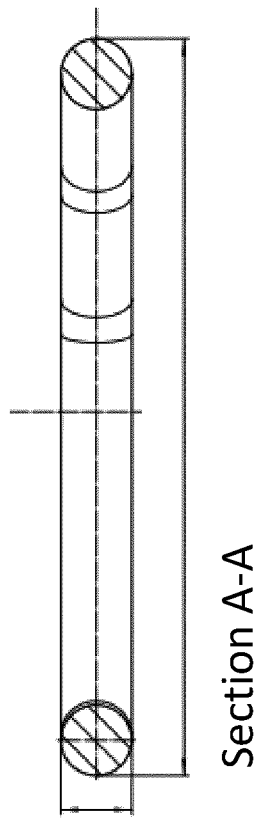

In FIGS. 10a and 10b a variant is shown which has three sets of first and second type ring portions RP1 and RP2, again having different radii, covering different angles, and having different lengths, such that it has become fit for use in an even larger diameter pipe fitting.

Besides the shown and described embodiments, numerous variants are possible. For example the dimensions and shapes of the various parts can be altered. Any dimensions indicated in the drawings are intended to be non-limiting and merely indicative for helping to determine some of the relative ratios. Also it is possible to make combinations between advantageous aspects of the shown embodiments. The sealing ring preferably gets made out of an elastic material, like for example EPDM or (H)NBR Other materials can however also be used.

It should be understood that various changes and modifications to the presently preferred embodiments can be made without departing from the scope of the invention, and therefore will be apparent to those skilled in the art. It is therefore intended that such changes and modifications be covered by the appended claims.

The invention claimed is:
1. A profiled leak-before-press sealing ring for leaving free empty leaking spaces between a socket and a pipe end of a press fitting in a non-compressed state, comprising:
 a plurality of first type ring portions; and
 a plurality of second type ring portions,
 wherein the first and second type ring portions lie alternating around a center axis,
 wherein the first type ring portions each extend arc-shaped around the center axis, and
 wherein the second type ring portions each extend linear-shaped with a straight inner surface and with a straight outer surface in a tangential direction that is perpendicular to a radial direction going through the center axis,
 wherein the arc-shaped first type ring portions each have a curved inner surface of a constant radius around the center axis and a curved outer surface of a constant radius around the center axis, wherein the ring further comprises:

a plurality of third type ring portions, wherein the third type ring portions extend arc-shaped in between respective ones of the arc-shaped first and linear-shaped second type ring portions, wherein the arc-shaped third type ring portions each connect with one of its head ends to a head end of a neighbouring one of the arc-shaped first type ring portions, and with an opposing one of its head ends to a head end of a neighbouring one of the linear-shaped second type ring portions, and wherein the arc-shaped first, the linear-shaped second, and the arc-shaped third type ring portions all have a same evenly large dimensioned cross-sectional shape.

2. The profiled leak-before-press sealing ring according to claim 1, wherein a tangential direction of the one head end of the arc-shaped third type ring portions corresponds to a tangential direction of the head end of the neighbouring one of the arc-shaped first type ring portions, and wherein a tangential direction of the opposing one of the head ends of the arc-shaped third type ring portions corresponds to the tangential direction of the neighbouring one of the linear-shaped second type ring portions.

3. The profiled leak-before-press sealing ring according to claim 1, wherein the third type ring portions each have a curved inner surface of a constant radius that is smaller than the constant radius of the curved inner surface of the first type ring portions, and each have a curved outer surface of a constant radius that is smaller than the constant radius of the curved outer surface of the first type ring portions.

4. The profiled leak-before-press sealing ring according to claim 1, wherein the linear-shaped second type ring portions each have their straight inner surface lie closer to the center axis than the curved inner surfaces of the arc-shaped first type ring portions, and the linear-shaped second type ring portions each have their straight outer surface lie closer to the center axis than the curved outer surfaces of the arc-shaped first type ring portions.

5. The profiled leak-before-press sealing ring according to claim 1, wherein three alternating sets of the arc-shaped first and the linear-shaped second type ring portions are provided with the third type ring portions each time provided in between them.

6. The profiled leak-before-press sealing ring according to claim 5, wherein the linear-shaped second type ring portions each have a length in their tangential direction of between 6-13 mm.

7. The profiled leak-before-press sealing ring according to claim 5, wherein the arc-shaped first type ring portions each cover an angle around the center axis of between 70-88 degrees.

8. The profiled leak-before-press sealing ring according to claim 1, wherein five alternating sets of the arc-shaped first and the linear-shaped second type ring portions are provided with the third type ring portions each time provided in between them.

9. The profiled leak-before-press sealing ring according to claim 8, wherein the linear-shaped second type ring portions each have a length in their tangential direction of between 6-13 mm.

10. The profiled leak-before-press sealing ring according to claim 8, wherein the arc-shaped first type ring portions each cover an angle around the center axis of between 18-38 degrees.

11. A press fitting for pipes, comprising:

a socket with an insertion space for a pipe end to be inserted therein, the insertion space having a press region which is delimited by a press wall part;

an annular groove-shaped space present in or delimited by the press wall part; and a sealing ring placed in the annular groove-shaped space, wherein the press region is plastically deformable from a non-compressed state towards a compressed state during a radially inward directed pressing action exerted by a press tool causing the press wall part to radially compress while the sealing ring comes to lie sealing all around its circumference against an inserted pipe end, and wherein the sealing ring is a profiled leak-before press sealing ring according to claim 1.

12. The press fitting according to claim 11, wherein the linear-shaped second type ring portions each have a straight inner surface that has a minimum radial distance from the center axis that is smaller than half an outer diameter of a pipe end to be inserted.

\* \* \* \* \*